United States Patent [19]

Taga et al.

[11] Patent Number: 5,440,268
[45] Date of Patent: Aug. 8, 1995

[54] AFC CIRCUIT FOR QPSK DEMODULATOR

[75] Inventors: Noboru Taga; Tatsuya Ishikawa; Susumu Komatsu, all of Kanagawa, Japan

[73] Assignee: Kabushiki Kaisha Toshiba, Kawasaki, Japan

[21] Appl. No.: 306,957

[22] Filed: Sep. 16, 1994

[30] Foreign Application Priority Data

Sep. 16, 1993 [JP] Japan .................................. 5-229780

[51] Int. Cl.⁶ .............................................. H03D 3/00
[52] U.S. Cl. .................................... 329/308; 329/309; 375/327; 375/328; 375/329
[58] Field of Search ............................. 329/304–310; 375/52–57, 81–87

[56] References Cited

U.S. PATENT DOCUMENTS

| | | | |
|---|---|---|---|
| 5,268,647 | 12/1993 | Ichiyoshi | 329/308 |
| 5,301,210 | 4/1994 | Vandamme et al. | 329/304 X |
| 5,341,105 | 8/1994 | Satou | 329/308 |

FOREIGN PATENT DOCUMENTS

| | | |
|---|---|---|
| 0526836 | 2/1993 | European Pat. Off. . |
| 0530107 | 3/1993 | European Pat. Off. . |
| 4360345 | 12/1992 | Japan . |
| 5110614 | 4/1993 | Japan . |
| 8504999 | 11/1985 | WIPO . |

*Primary Examiner*—David Mis
*Attorney, Agent, or Firm*—Cushman Darby & Cushman

[57] ABSTRACT

AFC circuit for QPSK demodulator including, a circuit for obtaining quadrature related detection signals by multiplying a modulated input signal with quadrature related local oscillation frequency signals from a quadrature phase local oscillator, digital converter for converting the detection signals into corresponding digital signals by sampling them with quadrature related clocks which have a frequency two times higher than a symbol rate of the input signal, frequency error detector for detecting a frequency error between the quadrature related digital signals using a symbol timing sample value and a symbol intermediate timing sample value in the converted digital signals, first validity determinator for determining whether the frequency error signal is valid or not through a detection of the pattern of the modulated input signal from sample values before and after the symbol timing so as to result a first validity signal, second validity determinator for deetermining whether the frequency error signal is valid or not through a detection of an absolute sample value of the symbol intermediate timing so as to result a second validity signal, and valid frequency error extractor for extracting the frequency error signal as a frequency control signal for controlling the oscillation frequency of the local oscillator when the frequency error signal has been proved to be valid by the first and the second validity signals.

4 Claims, 9 Drawing Sheets

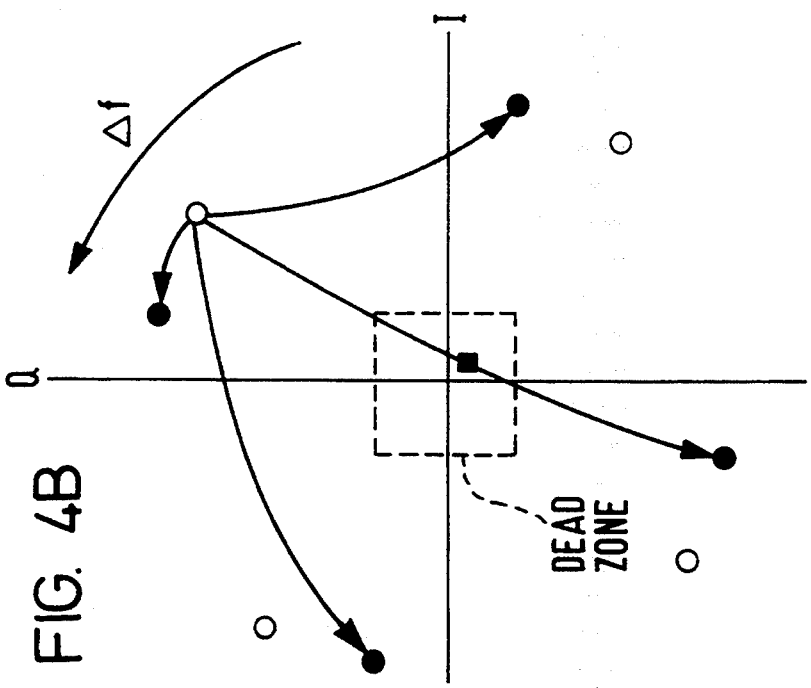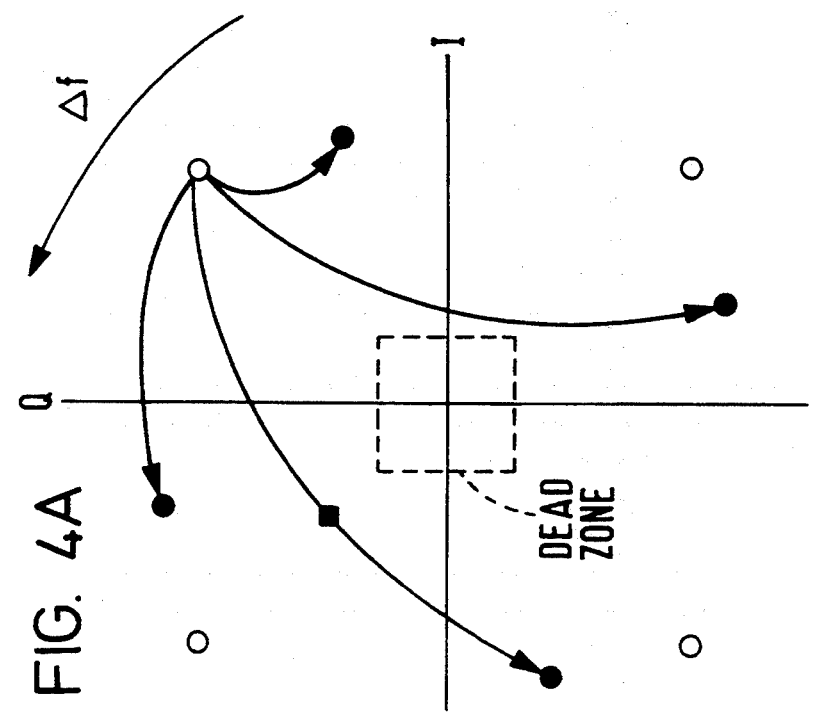

DETECTION ROM

| INPUT ADDRESS $A_0$ $A_1$ $A_2$ $A_3$ | OUTPUT |
|---|---|
| 0 0 0 0 | 0 |
| 0 0 0 1 | -1 |
| 0 0 1 0 | 1 |
| 0 0 1 1 | 0 |
| 0 1 0 0 | 1 |
| 0 1 0 1 | 0 |
| 0 1 1 0 | 0 |
| 0 1 1 1 | -1 |
| 1 0 0 0 | -1 |
| 1 0 0 1 | 0 |
| 1 0 1 0 | 0 |
| 1 0 1 1 | 1 |
| 1 1 0 0 | 0 |
| 1 1 0 1 | 1 |
| 1 1 1 0 | -1 |
| 1 1 1 1 | 0 |

AFC CIRCUIT FOR QPSK DEMODULATOR

FIELD OF THE INVENTION

The present invention generally relates to an AFC circuit, and more particularly, to an AFC circuit for a QPSK demodulator which is effective for a QPSK (quadrature-phase shift keying) modulated signal demodulation system which is utilized in fields of a satellite communication or a satellite broadcasting.

BACKGROUND OF THE INVENTION

There is a digital modulation technology useful for improvement of high quality transmission and frequency utilizing efficiency available for systems for transmitting video signals and/or audio signals and has been so far used in the fields of microwave ground communications and business use satellite communications. As the digital modulation system, 16QPAM (16-points Quadrature Amplitude Modulation) and 64QPAM (64-points Quadrature Amplitude Modulation), which have a good frequency utilization efficiency, are used for ground microwave telecommunication circuits, etc. On the other hand, a BPSK (Bi-Phase Shift Keying) modulation system and a QPSK (Quadrature Phase Shift Keying) modulation system, etc. which have a relatively low transmission code error rate have been generally used for satellite telecommunication circuits.

FIG. 1 is a block diagram showing a conventional demodulator. A QPSK modulated signal input to an input terminal 1 is parallelly supplied to both an in-phase detector 2 and a quadrature-phase detector 3. Local oscillation signals given to the detectors 2 and 3 are local oscillation signals generated from a fixed frequency local oscillator 5, which are divided to a 0° phase local oscillation signal and a 90° phase local oscillation signal by a distributor 4. Signals detected by the detectors 2, 3 are supplied to A/D converters 6, 7, respectively for conversions into digital values. These digitized detection signals are supplied to digital low-pass filters (LPFs) 8, 9 which have the same frequency transmission characteristic, respectively, for shaping their spectrums. These digital LPFs 8, 9 provide transmission characteristics required for preventing inter-symbol interferences in a digital data transmission. These digital LPFs 8, 9 are also designed so that so-called roll off characteristics can be generally obtained when then are associated with filter characteristics in transmission part. Therefore, the detection signals are spectrally shaped through these digital LPFs 8, 9 to make the eye-aperture rate sufficiency large. These filtered signals from the digital LPFs 8, 9 are each branched into two paths so that ones are supplied to a clock regenerator 10 where symbol timing component in the signal is extracted and fed back to the conversion clock inputs of the A/D converters 6 and 7. While the other signals branched from the digital LPFs 8, 9 are supplied to a complex multiplier 11.

The complex multiplier 11 operates in an almost similar manner as a conventional frequency converter, i.e., a mixer for converting a high frequency signal into a constant intermediate frequency signal. Here it is noted that a real number type multiplier using no complex number is able to perform the detecting operation but not able to operate as a general frequency converter since it fails to express negative frequency components. The multiplexed signal output from the complex multiplier 11 is input to a phase comparator 12 where a phase difference between the multiplexed signal and an oscillation signal generated by a numerical controlled oscillator (NCO), that will be described later, is detected. The output (phase difference information) of the phase comparator 12 is input to a data discriminator 13. The data discriminator 13 discriminates QPSK data, that is, demodulate it from the phase difference information and outputs the demodulated data.

Further, this phase difference information from the phase comparator 12 is input to the frequency control terminal of a NCO 15 via a loop filter 14 for regenerating carrier. The NCO 15 is a cumulative adder that does not prohibit overflow and according to a signal value input to the frequency control terminal, performs the adding operation up to its dynamic range and therefore, is placed in the oscillating state and its oscillation frequency changes according to a control signal value. That is, it operates in the entirely same manner as a voltage controlled oscillator (VCO) in an analog circuit. What are differing from a general VCO are that its oscillation frequency is extremely stable and it has a stability more than a so-called VCO (VCXO) using a crystal and a wide frequency variable range that cannot be realized by VCXO. The output of the NCO 15 is branched into two paths which return to the complex multiplier 11 via data converters 18, 17 having sine and cosine characteristics, respectively. This feedback loop from the the loop filter 14 to the complex multiplier 11 constitutes a PLL having a full digital construction in cooperation with the phase comparator 12. Here it is assumed that if the loop filter 14 includes a full integration system, the frequency pull-in range of the PLL is infinite as a principle and an ideal PLL operation can be expected.

Further, the circuits after the A/D converters 6, 7 are all for digital signal processing and when integrated, a demodulator, which is a very compact device, can be realized without any adjustment.

Next, an AFC loop has been formed in this system. That is, the phase difference signal output from the phase comparator 12 is supplied to a frequency error detector 19. This frequency error detector 19 detects a frequency error between an input and a local oscillation signal. This frequency error component is smoothed by an AFC loop filter 20 and supplied to the frequency control terminal of an NCO 22 via a latch 21. The NCO 22 oscillates a sawtooth waveform signal and then supplies the oscillation signal to a data converter 24 having a sine or cosine conversion characteristic. The output of the data converter 24 is supplied to a D/A converter 25 where the oscillation signal is converted into a corresponding analog signal. The D/A converter 25 supplies the oscillation signal to a phase detector 26 which comprises a frequency multiplier in cooperation with an amplifier 27, an oscillator 28 and a frequency divider 29. The frequency multiplier supplies the frequency multiplied signal to the distributor 4 wherein the signal is divided into the 90° local oscillation signal and the 0° local oscillation signal as described previously.

When the frequency retuning is made sufficiently small by the AFC operation, the frequency error detection output of the frequency error detector 19 varies. As a result, a loop switching signal is output from the frequency error detector 19 and at the same time, an AFC hold signal is output. These two signals are substantially the same. The loop switching signal switches the loop filter 14 in the PLL to the operating state. Thus, the PLL operation starts and the frequency error information in the AFC loop is held when the AFC is in the best state. The PLL starts the frequency pull-in operation to synchronize with carrier.

Next, a frequency multiplier in the fixed frequency local oscillator 5 will be explained.

The frequency multiplier comprises the phase detector 26, the amplifier 27 which amplifies the detection output of the phase detector 26, the VCO 28 to which frequency control terminal the output of the amplifier 27 is supplied, and the frequency divider 29 which makes N-division of the output of the VCO 28. The output of the frequency divider 29 is supplied to the phase detector 26. This circuit comprises the PLL. For instance, if the output of the D/A converter 25 is 4.375 MHz and a dividing ratio of the frequency divider 29 is 32, oscillation frequency of the VCO 28 becomes 140 MHz. Further, to make oscillation frequency of the NCO 22 to 4.275 MHz in the state without frequency errors, it is only needed to add an offset equivalent to this oscillation frequency to the frequency control input of the NCO 22 in advance.

As a result, it is possible to regard the circuit ranging from the NCO 22 to the VCO 28 as a single 140 MHz NCO. Therefore, this oscillation frequency is extremely stable and it is possible to get the stability of several ten times of the ordinary stability of the VCO 28.

Further, the amplifier 27 contained in the frequency multiplier is normally a loop filter. In this case, however, if the response of the frequency multiplier is made as fast as possible, there is an advantage to facilitate design of the entire AFC loop. Therefore, the amplifier 27 is not shown as a loop filter but is simply shown as an amplifier (if the response of the frequency multiplier is slow, this time constant is decided by the overall characteristic of the time constant of the AFC loop filter). The output of the VCO 28 is input to the 0° and 90° distributor 4 and is turned to the in-phase detected local oscillation signal and the D-A detected local oscillation signal, respectively.

Since local oscillation signals are fed back and controlled by the frequency error signal, they are D-A synchronous detected in the state almost without frequency detuning. Therefore, when shaped the spectrums, they can be demodulated in the almost ideal state without the spectrum being narrowed.

Further, as a large delay element is not contained in the carrier regeneration PLL as described above, it is possible to regenerate carrier with a good jitter characteristic. Further, as the wide PLL frequency pull-in range is available, an extremely severe characteristic is not required for the AFC operation. That is, even when some frequency error in the pull-in range of this PLL circuit remains, it is possible to regenerate the carrier.

FIG. 2A is a definite example of the NCO 22 for the AFC loop. The substance of the NCO 22 is the same as the NCO 15 in the PLL. A signal input to a frequency control terminal 200 is supplied to the one of the inputs of an adder 201 and the output of the adder 201 is supplied to the other input after delayed by one clock by a latch 202. As a result, the latch 202 acts as an accumulator for generating a sawtooth wave signal. The frequency of the sawtooth wave signal is controllable by a numerical value applied to the control terminal 200 if a clock has a fixed frequency.

FIG. 2B is an exemplified arrangement of the frequency error detector 19 in the embodiment described above. It is assumed that a phase difference signal is supplied to an input terminal 300. The circuit comprising a latch 301 using symbol timing of the digital modulated signal as a clock and a subtractor 302 detects a phase difference between symbols of the digital modulated signals. This is nothing but to detect a frequency error. Therefore, this phase difference signal is supplied to an output terminal 303. Further, the frequency error detection output is also branched to an LPF 304 and after smoothed sufficiently by this filter, binalized in a binarizer 308 via an absolute value circuit 305 which removes plus and minus symbols. This binarized output is transmitted as a signal to select whether AFC or PLL operation is to be executed (the former AFC hold and loop switching signal).

The prior art AFC circuit for the QPSK demodulator, as described above, has a problem of frequency pull-in range. As this AFC circuit detects the frequency error through a detection of a phase difference between symbols, the AFC circuit can detect the frequency error up to $\pm \frac{1}{8}$ of a symbol rate of a QPSK modulated signal. Therefore, the frequency pull-in range of the AFC circuit is limited to the range of $\pm \frac{1}{8}$ of the symbol rate of QPSK modulated signal, so that the AFC circuit cannot cope with a frequency error exceeding the range.

SUMMARY OF THE INVENTION

It is, therefore, an object of the present invention to provide an AFC circuit for QPSK demodulator which is able to perform a frequency pull-in up to the range of $\pm \frac{1}{4}$ of a symbol rate.

In order to achieve the above object, an AFC circuit for QPSK demodulator according to one aspect of the present invention includes, a circuit for obtaining quadrature related detection signals by multiplying a modulated input signal with quadrature related local oscillation frequency signals from a quadrature phase local oscillator, digital converter for converting the detection signals into corresponding digital signals by sampling them with quadrature related clocks which have a frequency two times higher than a symbol rate of the input signal, frequency error detector for detecting a frequency error between the quadrature related digital signals using a symbol timing sample value and a symbol intermediate timing sample value in the converted digital signals, first validity determinator for determining whether the frequency error signal is valid or not through a detection of the pattern of the modulated input signal from sample values before and after the symbol timing so as to result a first validity signal, second validity determinator for deetermining whether the frequency error signal is valid or not through a detection of an absolute sample value of the symbol intermediate timing so as to result a second validity signal, and valid frequency error extractor for extracting the frequency error signal as a frequency control signal for controlling the oscillation frequency of the local oscillator when the frequency error signal has been proved to be valid by the first and the second validity signals.

By executing the sampling with quadrature related clocks which have a frequency two times higher than a symbol rate of the input signal according to the multiplying means and using a symbol timing sample value and a symbol intermediate timing sample value, it is possible to detect the direction of a frequency offset based on the quadrant change between symbol timing samples and the quadrant information on the intermediate timing sample and to expand the frequency pull-in range of the AFC operation up to ±¼ of the symbol rate of the QPSK modulated signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4A and 4B are I-Q vector diagrams for explaining the principle of frequency error detection;

DESCRIPTION OF THE PREFERRED EMBODIMENTS

The present invention will be described in detail with reference to the FIGS. 3 through 9.

Figure 1:
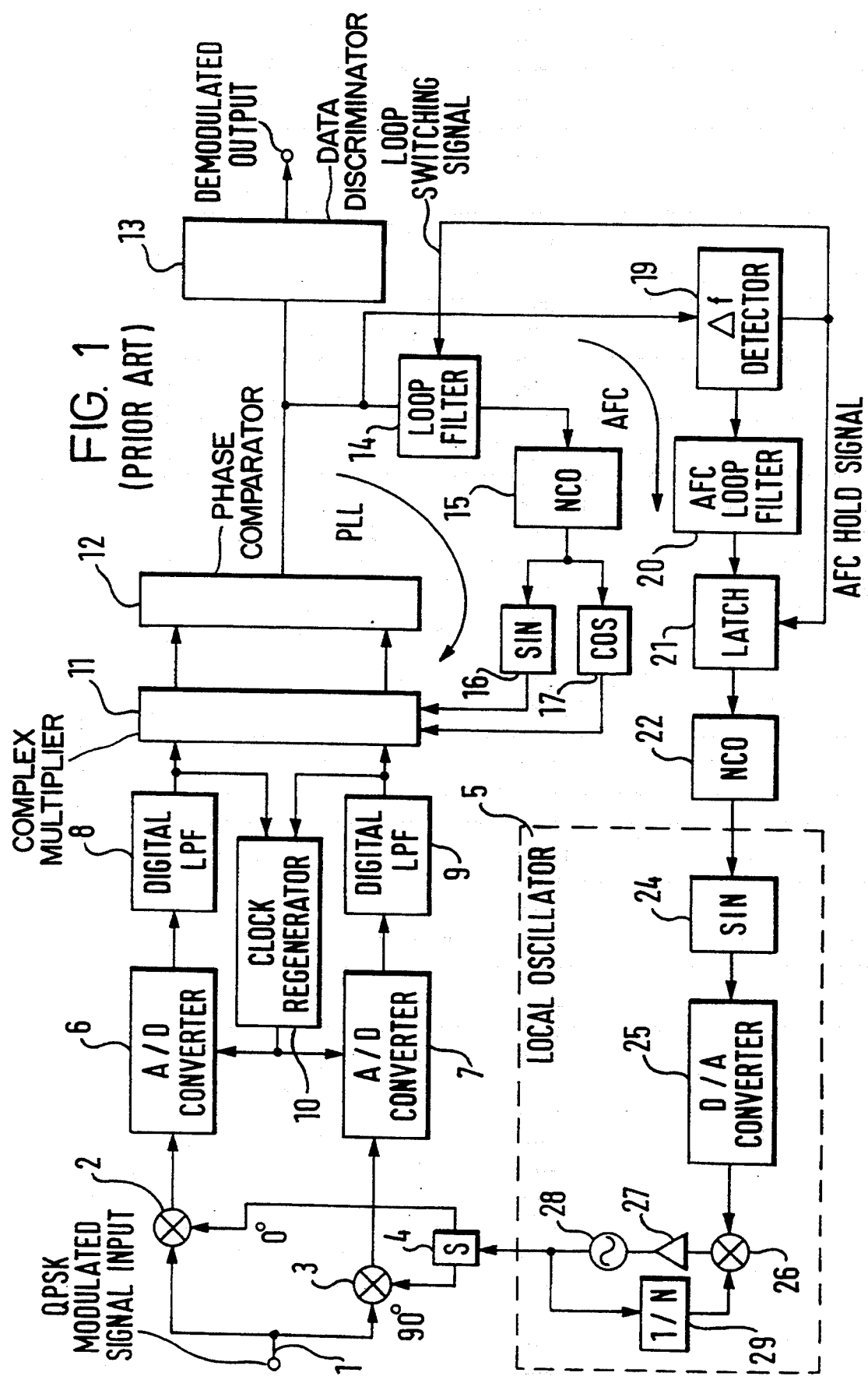
FIG. 1 is a diagram showing a conventional QPSK demodulator.
Figure 2A:
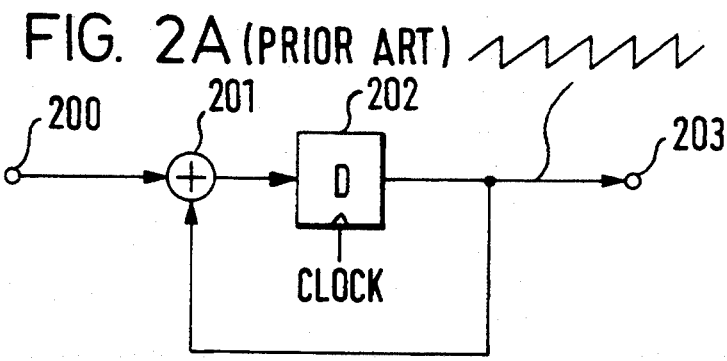
FIG. 2 is a diagram showing an example of the NCO 22 shown in FIG. 1.
FIG. 2B is an example of the frequency error detector 19 shown in FIG. 1.
Figure 2B:
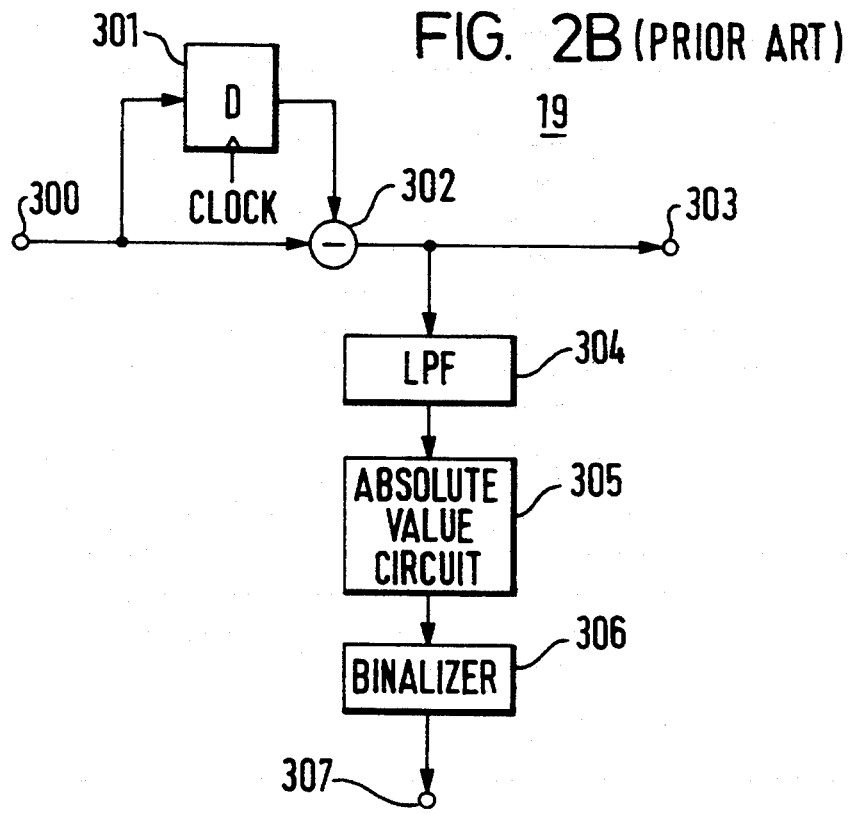

Throughout the drawings, reference numerals or letters in FIGS. 1, 2A and 2B will be used to designate like or equivalent elements for simplicity of explanation.

Figure 3:
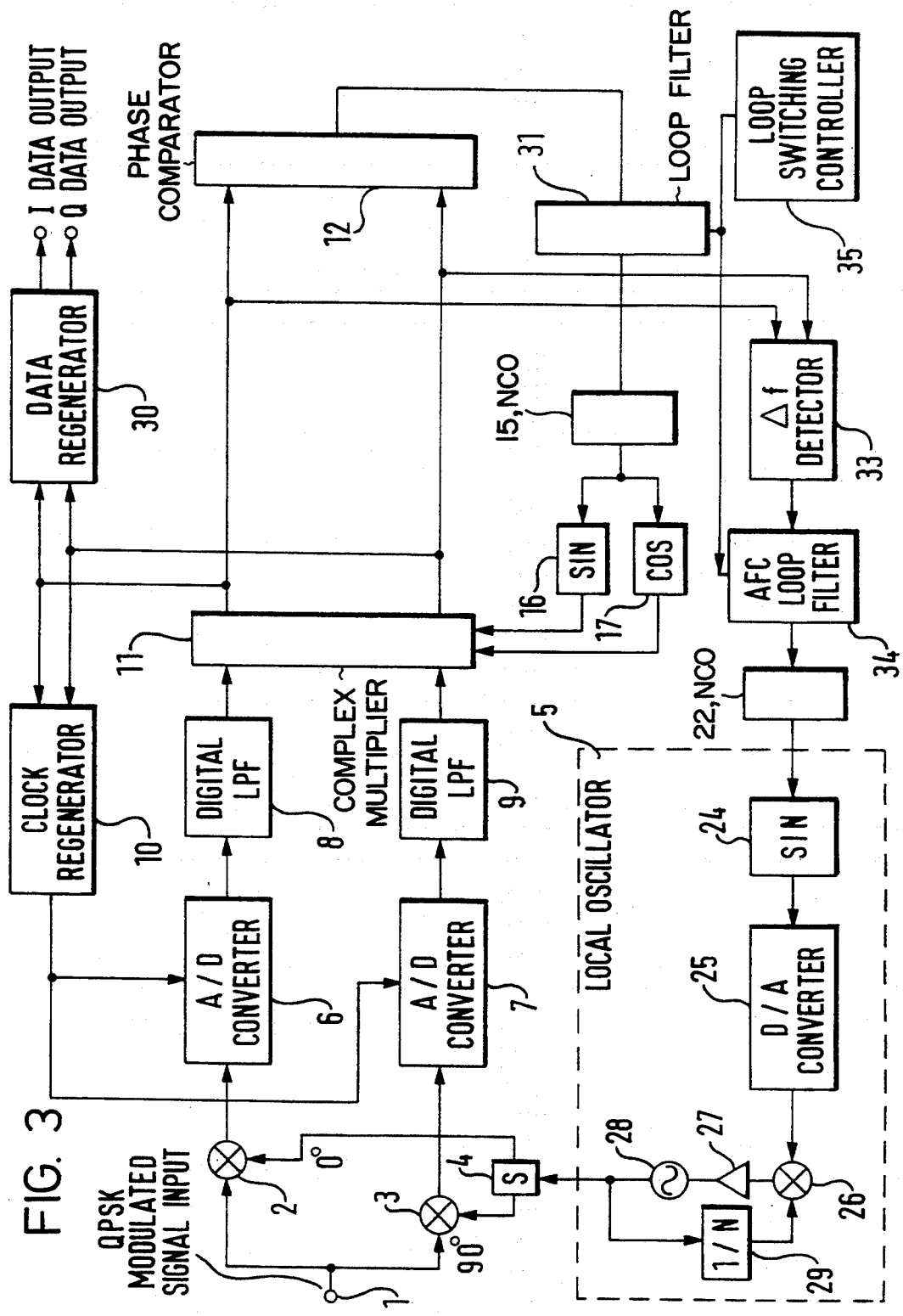
FIG. 3 is a diagram showing the first embodiment of the present invention.

Referring now to FIG. 3, a first embodiment of the AFC circuit for QPSK demodulator according to the present invention will be described in detail.

FIG. 3 is the first embodiment of the present invention. Reference numerals used in the conventional circuit as shown in FIG. 1 will be used to designate the same or equivalent elements.

A QPSK modulated signal input to an input terminal 1 is parallelly supplied to both an in-phase detector 2 and a quadrature-phase detector 3. Local oscillation signals given to the detectors 2 and 3 are local oscillation signals generated from a fixed frequency local oscillator 5, which are divided to a 0° phase local oscillation signal and a 90° phase local oscillation signal by a distributor 4. Signals detected by the detectors 2, 3 are supplied to A/D converters 6, 7, respectively for conversions into digital values.

Here, the A/D converters 6, 7 digitize the detected signals with a clock which has a frequency two times higher than a symbol rate of the QPSK modulated signal supplied from a clock regenerator 10, as described later.

These digitized detection signals are supplied to digital LPFs 8, 9 which have the same frequency transmission characteristic, respectively, for shaping their spectrums. These digital LPFs 8, 9 provide transmission characteristics required for preventing intersymbol interferences in a digital data transmission. These digital LPFs 8, 9 are also designed so that so-called roll off characteristics can be generally obtained when then are associated with filter characteristics in transmission part. Therefore, the detection signals are spectrally shaped through these digital LPFs 8, 9 to make the eye-aperture rate sufficiency large. These filtered signals from the digital LPFs 8, 9 are branched so that ones are supplied to a clock regenerator 10 where symbol timing component in the signal is extracted and fed back to the conversion clock inputs of the A/D converters 6 and 7. While the other signals branched from the digital LPFs 8, 9 are supplied to a complex multiplier 11.

The complex multiplier 11 operates in an almost similar manner as a conventional frequency converter, i.e., a mixer for converting a high frequency signal into a constant intermediate frequency signal. Here it is noted that a real number type multiplier using no complex number is able to perform the detecting operation but not able to operate as a general frequency converter since it fails to express negative frequency components. The multiplied quadrature-related signals output from the complex multiplier 11 are each branched into four paths. That is, the multiplied quadrature-related signals are supplied to the clock regenerator 10, a data regenerator 30, the phase comparator 12 and a frequency error detector 33. In the clock regenerator 10, the symbol timing component in a signal is extracted and is fed back to the conversion clock inputs of the A/D converters 6 and 7. The data regenerator 30 decodes the digitized symbol timing input signal so that I data and Q data of the original QPSK analog data are restored.

Further, the phase comparator 12 detects a phase difference of the multiplexed signals from an oscillation signal generated by an NCO, which will be described later. This phase difference information from the phase comparator 12 is supplied to the frequency control terminal of the numeral control oscillator 15 for regenerating a carrier via a loop filter 31. The carrier output from the NCO 15 is branched into two parts both of which are returned to the complex multiplier 11 via the data converters 16, 17 having sine and cosine characteristics, respectively. This round of loop constitutes a full digital PLL.

Next, the AFC loop will be explained. The output of the complex multiplier 11 is supplied to the frequency error detector 33, where the frequency offset direction between the frequencies of the input signal and the local oscillation signal is discriminated. This frequency error detector 33 will be described later in detail.

The detection signal output from the frequency error detector 33 is supplied to the frequency control terminal of the NCO 22, after smoothed in an AFC loop filter 34. As the oscillated output of the NCO 22 has a sawtooth wave, it is supplied to the data converter 24 which has a sine or cosine conversion characteristic. The output of the data converter 24 is supplied to the phase detector 26 constituting a part of the fixed frequency local oscillator 5, after passing through the D/A converter 25. The oscillation output from the fixed frequency local oscillator 5 is supplied to the distributor 4 as a local oscillation signal and turned to the 90° and 0° local oscillation signals as described previously.

From the loop switching controller 35, the loop switching signal is output to actuate the AFC and prohibit the PLL to operate when starting the operation and is supplied to the PLL loop filter 31 and the AFC loop filter 34. Thereafter, when a given time has passed, the AFC is controlled to the hold state and the PLL is controlled to start to operate.

FIGS. 4A and 4B are I-Q vector diagrams for explaining the principle of the frequency offset direction detection at the frequency error detector 33 of FIG. 3.

In FIG. 4A, when the n-th symbol is at the white circle position, the (n+1)-th symbol appears at the black circle position as a frequency offset $\Delta f$ exists. At this time, when symbols move diagonally, that is, for instance, when the n-th symbol exists in the first quadrant and the (n+1)-th symbol appears in the third quadrant, a sample at the intermediate point appears in the second quadrant as shown by the black square position. Thus, it is possible to detect the direction of frequency offset according to a quadrant in which the intermediate sample exists when the symbols move diagonally. Further, as shown in FIG. 4B, even when the frequency offset $\Delta f$ exists, depending upon size of the frequency offset $\Delta f$ and the phase of symbols, the intermediate point may appear in the fourth quadrant when the symbol moves from the first quadrant to the third quadrant likewise the above. This means that a frequency offset in the reverse direction is detected in an error. So, in order to prevent such an erroneous detection, a so-called dead zone is provided to make a frequency error signal invalid if the intermediate point exists in the area shown by a broken line. According to this technique, it becomes possible to detect the direction of frequency offset up to $\pm \frac{1}{4}$ of a symbol rate.

Next, the frequency error detector 33 will be described.

Figure 5:
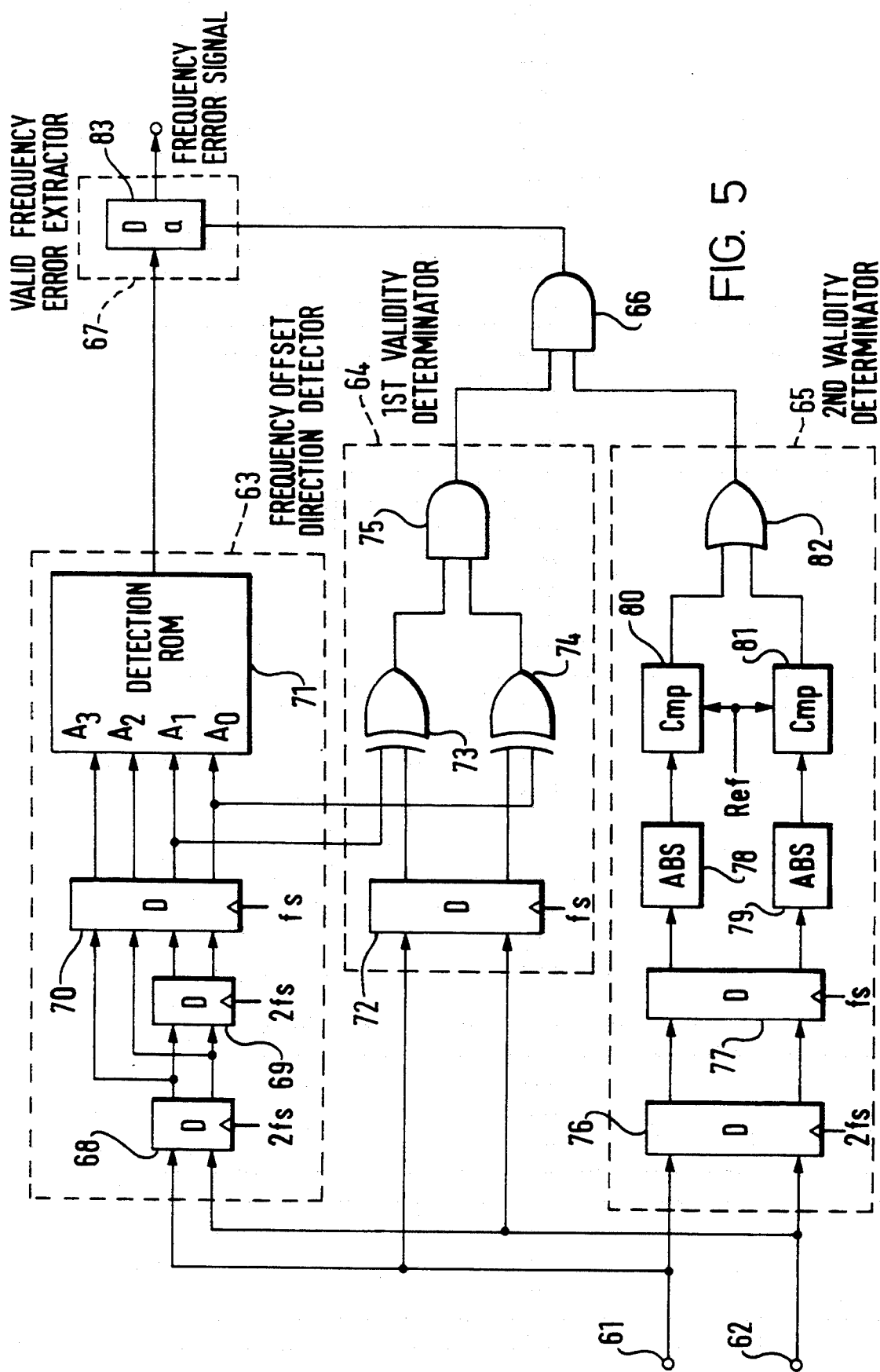
FIG. 5 is a diagram showing an example of the frequency error extractor shown in FIG. 3.

FIG. 5 shows an example of the frequency error detector 33. fs represents a clock having the same frequency with a symbol rate synchronizing with a symbol timing, while 2fs represents another clock which has a frequency two times of the symbol rate. The I signal and the Q signal sampled by the frequency clock 2fs are supplied to input terminals 61 and 62, respectively. These signals I and Q are supplied to a frequency offset direction detector 63, a first validity determinator 64 and a second validity determinator 65.

Figures 6A, 6B:
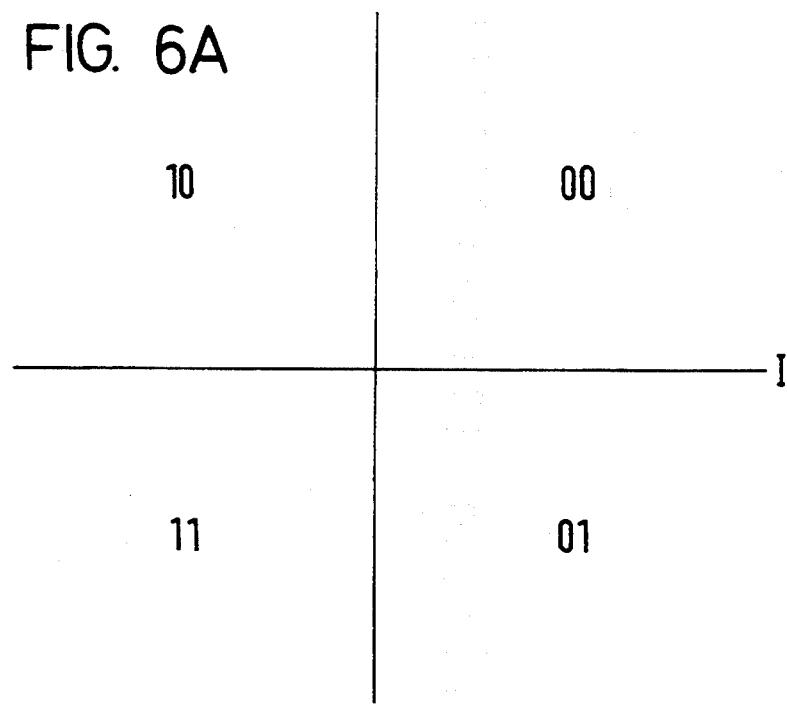
FIG. 6A is an explanatory diagram illustrating code bits of the quadrant information for explaining the operation of the frequency offset direction detector shown in FIG. 5.
FIG. 6B is a logic table of operation in the detection ROM shown in FIG. 5.

The frequency offset direction detector 63 detects the frequency offset direction according to the quadrant information of a symbol timing sample value and the quadrant information of a symbol intermediate timing sample value, and outputs the detected information as a frequency offset direction indicating signal. The frequency offset direction detector 63 has a latch 88 for latching the I and Q signals at the 2fs clock, a latch 89 operating at the clock 2fs and a latch 70 operating at the fs clock to which the output of the latch 88 is supplied. The output of the latch 89 is also supplied to the latch 70. The output of the latch 70 is supplied to a detection ROM 71. Thus, the quadrant information (i.e., code bits) of the I and Q signal symbol timing sample values and the quadrant information (i.e., code bits) of the symbol intermediate timing sample value are supplied to the detection ROM 71. Using these information, the detection ROM 71 produces an output as shown in FIGS. 8A and 8B. FIG. 6A shows code bits of the quadrant information. Further, shown in FIG. 6B are output data from the detection ROM 71 according to the code bits of the symbol timing sample values and the symbol intermediate timing sample value. These output data from the detection ROM 71 are given to a latch 83 of a valid frequency error extractor 67.

The first validity determinator 64 determines whether a symbol timing sample value has moved to the diagonal quadrant between two consecutive samples and then outputs the first validity determining signal. The first validity determinator 64 includes a latch 72 operating at the fs clock) to which the I and Q signals are supplied. The code bits of the I signal and Q signal output from this latch 72 are supplied to respective one ends of exclusive-OR gates 73, 74. To the other ends of these exclusive-OR gates 73, 74, the outputs of the latch 70 (Q signal code bit, I signal code bit) are supplied. Thus, the exclusive-OR gates 73, 74 are given with code bits of before and after sample values as the first and the second inputs. The outputs of the exclusive-OR gates 73, 74 are supplied to an AND gate 75. Thus, it is determined whether the symbol timing sample value has moved to the diagonal quadrant between two consecutive samples and if moved, the first validity determining signal of Logic 1 is output.

The second validity determinator 65 determines whether an absolute value of the symbol intermediate timing sample value is larger than a specified value. If determined the larger state, the second validity determinator 65 generates the second validity determining signal which indicates the value being valid. The I and Q signals are supplied to a latch operating at the 2fs clock and a latch 77 operating at the fs clock, successively. The symbol intermediate timing sample of the I signal obtained from the latch 77 is supplied to an absolute value circuit 78, while the symbol intermediate timing sample of Q signal is supplied to an absolute value circuit 79. The outputs of the absolute value circuits 78, 79 are supplied to comparators 80, 81 for comparison with reference values. Here, the comparators 80, 81 output the logic 1 if the inputs thereto are larger than the reference values, or the Logic 0 if they are smaller than the reference values. The outputs of the comparators 80, 81 are supplied to one input end of an AND gate 66 as the second validity signal, while the first validity signal is supplied to the other input end of the AND gate 66. The output of the AND gate 66 is supplied to the clear input end of the latch 83 of the valid frequency error extractor 67.

The valid frequency error extractor 67 resets the frequency offset direction indicating signal from the frequency offset direction detector 63 by the AND signal of the first and the second validity determining signals processed in the AND gate 66. That is, when the symbol timing sample moves to the diagonal quadrant and the absolute value of the symbol intermediate timing sample of the I or Q signal is larger than a specified value, the frequency offset direction indicating signal from the frequency offset direction detector 63 is latched by the valid frequency error extractor 67.

Figure 7A:
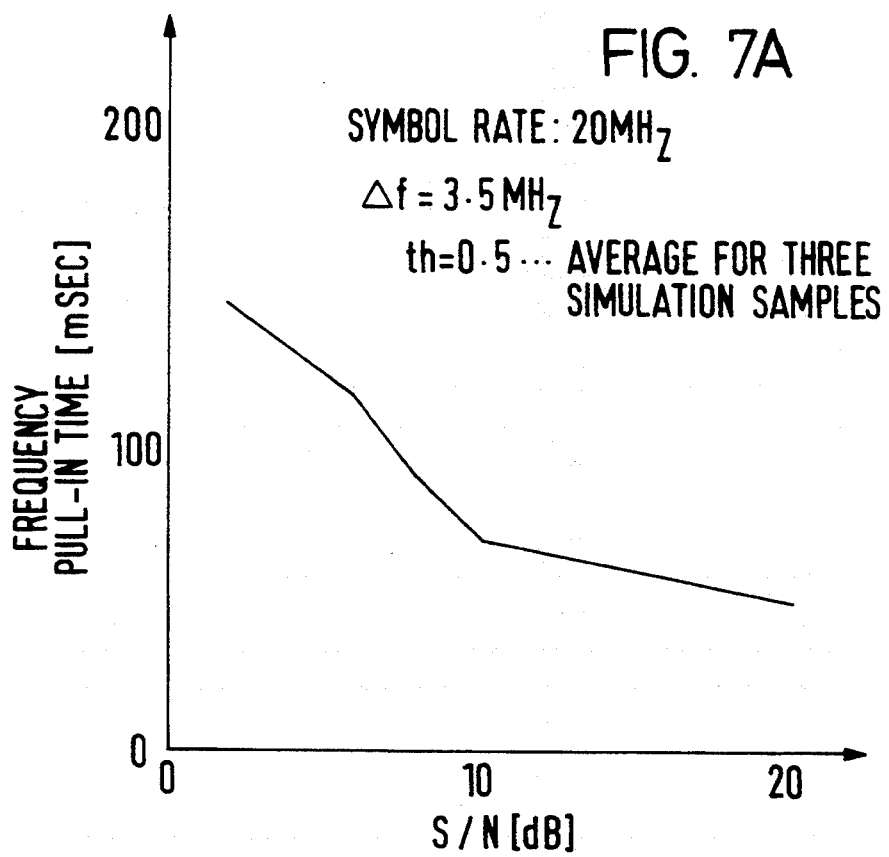
FIG. 7A is a diagram showing the a computer simulation result calculated for a frequency pull-in time to the C/N of the AFC.
Figure 7B:
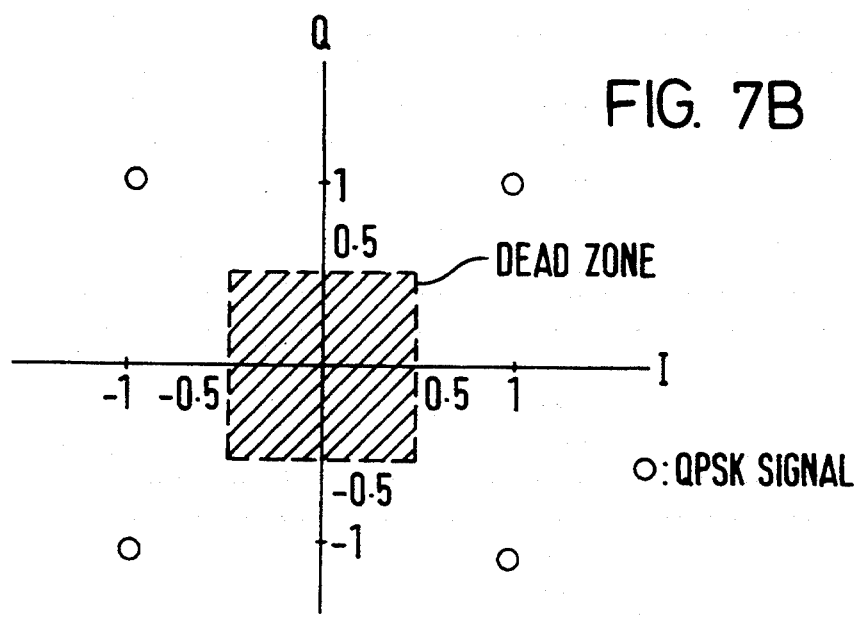
FIG. 7B is an I-Q vector diagram showing a specified condition for the simulation of the frequency pull-in time to the C/N of the AFC.

FIG. 7A shows a computer simulation result calculated for a frequency pull-in time to the C/N (carrier to noise ratio) of the AFC. Here, an average of three simulation results is shown by assuming that the symbol rate of a QPSK modulated signal has a 20 MHz, the initial frequency offset is a 3.5 MHz and specified values (i.e., values defining the dead zone area) of the second validity determinator 65 are halves of respective symbol positions of the I and Q signals, as shown in FIG. 7B. Thus, it can be seen that the frequency pull-in will be made within a period about 150 msec even when the ratio C/N=2 dB.

Figure 8:
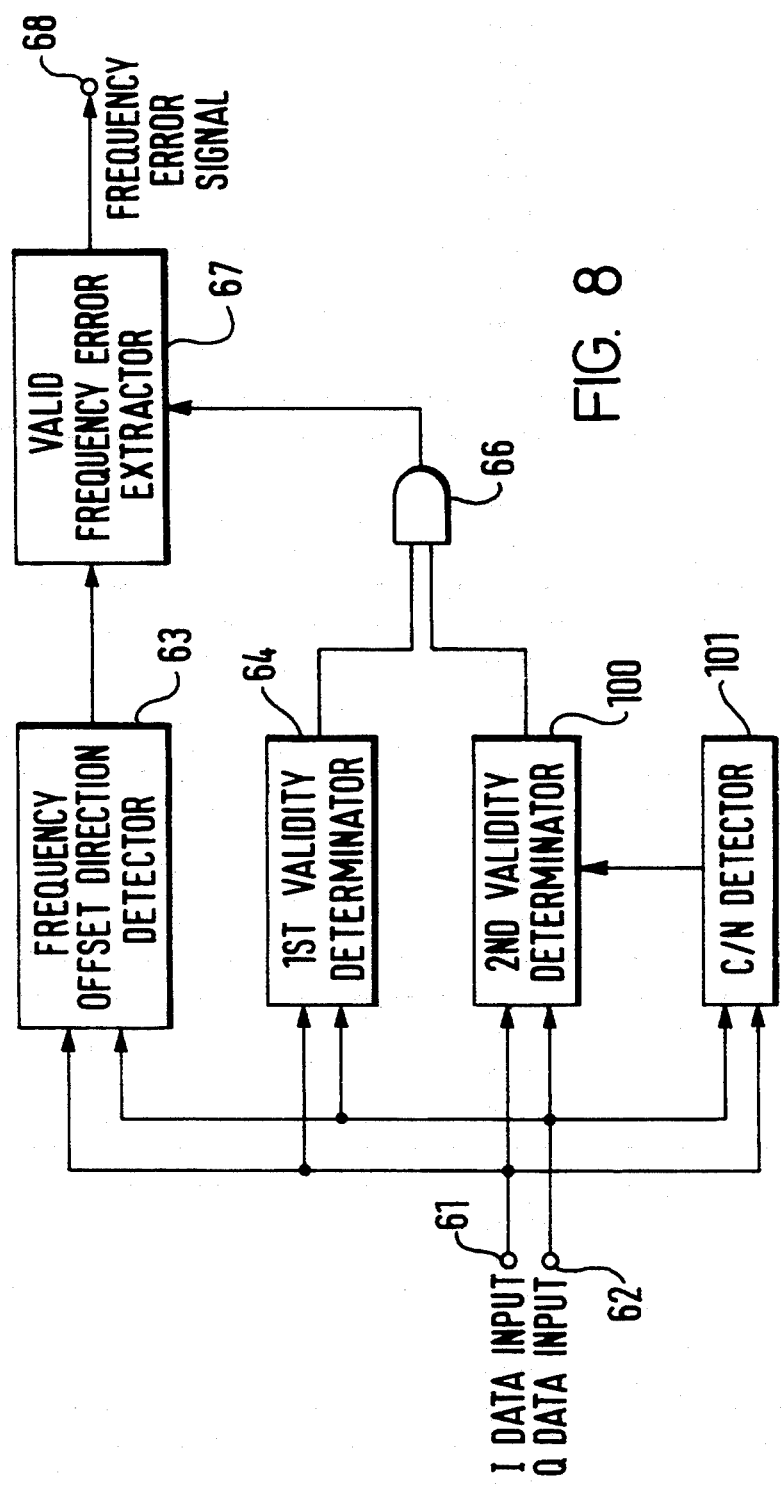
FIG. 8 is a diagram showing another example of the frequency offset direction detector shown in FIG. 5.

Shown in FIG. 8 is a second embodiment of the frequency error detector of the present invention. The same numerals are assigned to the same elements as the frequency error detector shown in FIG. 5. In case of this embodiment, the portions of a second validity determinator 100 and a C/N detector 101 differ from the embodiment shown in FIG. 5. The I and Q signals are also supplied to the C/N detector 101. The C/N detector 101 detects the C/N by obtaining dispersion of an absolute symbol timing sample value and gives the value of the detected C/N to the second validity determinator 100. The detected value of the C/N is used in the second validity determinator 100 as a signal for adjusting the size of a dead zone and makes the reference signal given to the comparators 80, 81 shown in FIG. 5 variable. This signal is used to reduce the erroneous detection by making a dead zone large if the C/N is low and thus, it becomes possible to make a frequency pull-in time short.

Figure 9:
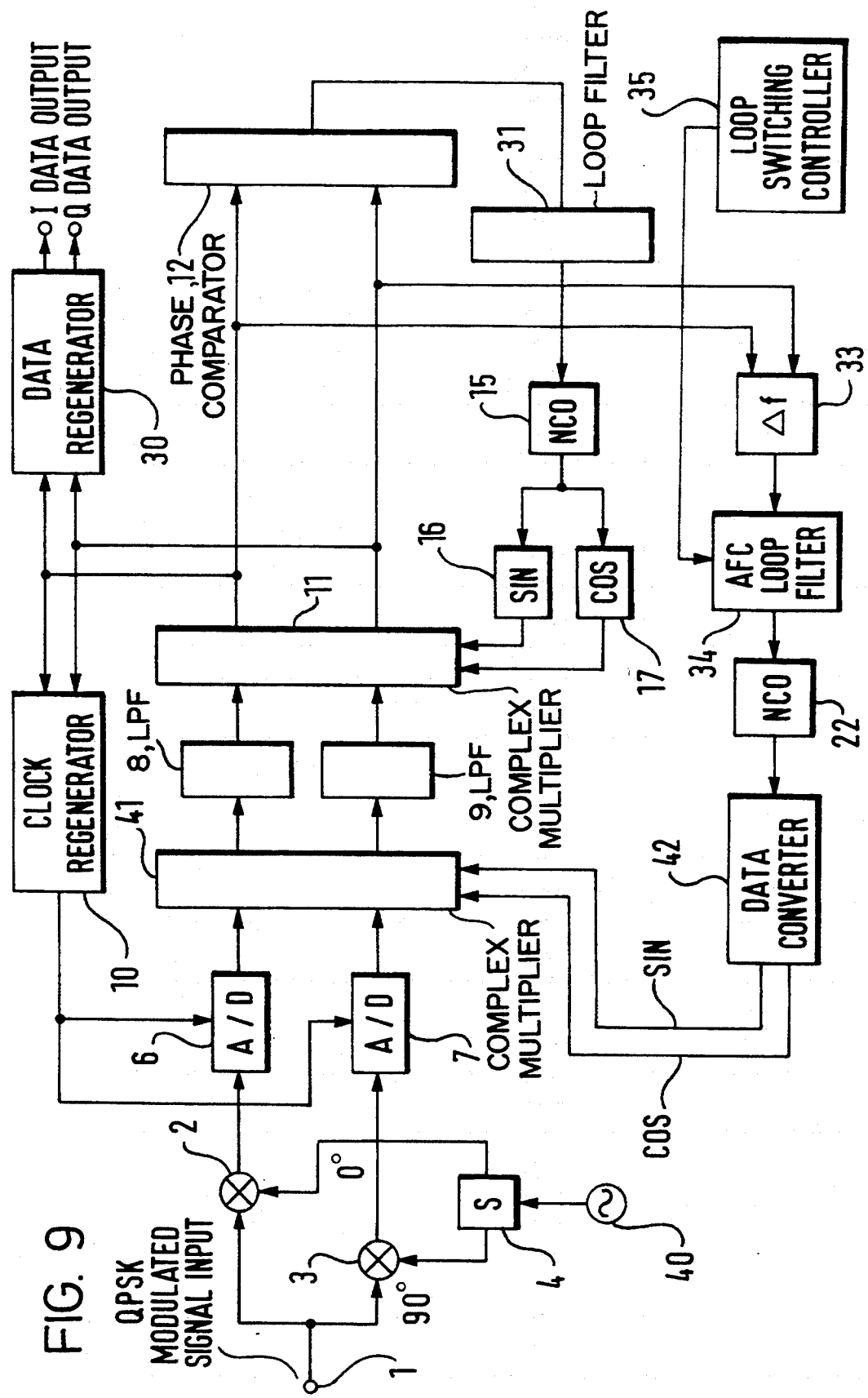
FIG. 9 is a diagram showing the second embodiment of AFC circuit for QPSK demodulator according to the present invention.

FIG. 9 shows a third embodiment of the present invention.

The same numerals are assigned to the same elements as in the embodiment shown in FIG. 3. This embodiment is different from the embodiment in FIG. 3 in following points. That is, an oscillator to get local oscillation signals of detectors 2 and 3 is constituted by a fixed frequency local oscillator 40. The outputs of A/C converters 6, 7 are supplied to a complex multiplier 41. The output of this complex multiplier 41 is supplied to the digital LPFs 8, 9. The output of NCO 22 is supplied to a data converter 42 to get carriers having sine and cosine characteristics. Further, carriers from the data converter 49, are supplied to the complex multiplier 41. In this embodiment, thus, input modulated signals are in-phase with each other, and D-A detected by 0° and 90° local oscillation signals from the fixed frequency local oscillator 40. The detection outputs from the detectors 2, 3 are complex multiplied in the complex multiplier 41 after digitized in the A/D converters 6, 7. The result of complex multiplication is supplied to a complex multiplier 11 after passing through the digital LPFs 8, 9. The result of complex multiplication here is supplied to the frequency error detector 33. The frequency error signal obtained from the frequency error detector 33 is taken out likewise the previous embodiment and is used to control the oscillation frequency of the NCO 22. The oscillated output of the NCO 22 is supplied to the data converter 42 which has sine and cosine conversion characteristics. The converted output obtained from this data converter 42 is supplied to the complex multiplier 41 as a frequency conversion carrier. The AFC loop is composed of this round of loop.

The present invention is not limited to the embodiments described above but may be embodied in various modified forms without departing from the spirit and scope thereof.

As described above, the present invention can provide an extremely preferable AFC circuit for QPSK demodulator, by performing the symbol timing sampling at a clock frequency which is two times the frequency of a symbol rate, it is possible to detect the frequency offset direction and the pull-in frequency detuning up to $\pm\frac{1}{4}$ of the symbol rate of the QPSK modulated signal wave symbol rate based on quadrant changes between symbol timing samples and quadrant information on its intermediate timing sample using a symbol timing sample and a symbol intermediate timing sample.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An AFC circuit for a QPSK demodulator comprising:
    means for obtaining quadrature related detection signals by multiplying a modulated input signal with quadrature related local oscillation frequency signals from a quadrature phase local oscillator;
    digital conversion means for converting the detection signals into corresponding digital signals by sampling them with quadrature related clocks which have a frequency two times higher than a symbol rate of the input signal;
    frequency error detection means for detecting a frequency error between the quadrature related digital signals using a symbol timing sample value and a symbol intermediate timing sample value in the converted digital signals;
    first validity determining means for determining whether the frequency error signal is valid or not through a detection of the pattern of the modulated input signal from sample values before and after the symbol timing so as to result a first validity signal;
    second validity determining means for determining whether the frequency error signal is valid or not through a detection of an absolute sample value of the symbol intermediate timing so as to result a second validity signal; and
    valid frequency error extracting means for extracting the frequency error signal as a frequency control signal for controlling the oscillation frequency of the local oscillator when the frequency error signal has been proved to be valid by the first and the second validity signals.

2. An AFC circuit for a QPSK demodulator as claimed in claim 1, wherein the second validity determining means has means for detecting a C/N (carrier to noise ratio) of the modulated input signal and means, if the C/N is lower than a prescribed level, for broadening the validity determination limits for the second validity signal based on the detected C/N.

3. An AFC circuit for a QPSK demodulator comprising:
   means for obtaining quadrature related detection signals by multiplying a modulated input signal with quadrature related local oscillation frequency signals from a quadrature phase local oscillator;
   digital conversion means for converting the detection signals into corresponding digital signals by sampling them with quadrature related clocks which have a frequency two times higher than a symbol rate of the input signal;
   frequency conversion means for converting frequencies through a complex multiplication of multiplying the digital outputs from the frequency conversion means with a frequency conversion carrier;
   frequency error detection means for detecting a frequency error between the quadrature related frequency converted signals using a symbol timing sample value and a symbol intermediate timing sample value in the frequency converted signals;
   first validity determining means for determining whether the frequency error signal is valid or not through a detection of the pattern of the modulated input signal from sample values before and after the symbol timing so as to result a first validity signal;
   second validity determining means for determining whether the frequency error signal is valid or not through a detection of an absolute sample value of the symbol intermediate timing so as to result a second validity signal; and
   valid frequency error extracting means for extracting the frequency error signal as a frequency control signal for controlling the oscillation frequency of the local oscillator when the frequency error signal has been proved to be valid by the first and the second validity signals,
   valid frequency error extracting means for extracting the frequency error signal as a frequency control signal for controlling the oscillation frequency of the frequency conversion carrier when the frequency error signal has been proved to be valid by the first and the second validity signals.

4. An AFC circuit for a QPSK demodulator as claimed in claim 3, wherein the second validity determining means has means for detecting a C/N of the modulated input signal and means, if the C/N is lower than a prescribed level, for broadening the validity determination limits for the second validity signal based on the detected C/N.

* * * * *